(12) United States Patent
Dennes et al.

(10) Patent No.: US 10,899,181 B2
(45) Date of Patent: Jan. 26, 2021

(54) TIRE PUNCTURE DETECTION AND ALERT

(71) Applicant: International Business Machines Corporation, Armonk, NY (US)

(72) Inventors: Albert Dennes, Tucson, AZ (US); Junfeng Xu, Tucson, AZ (US); John A. Rohe, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/421,310

(22) Filed: May 23, 2019

(65) Prior Publication Data

US 2020/0369098 A1    Nov. 26, 2020

(51) Int. Cl.
| | | |
|---|---|---|
| B60C 19/00 | (2006.01) | |
| B60C 23/04 | (2006.01) | |
| B60C 19/12 | (2006.01) | |

(52) U.S. Cl.
CPC ............ *B60C 19/00* (2013.01); *B60C 19/122* (2013.01); *B60C 23/0401* (2013.01); *B60C 23/0493* (2013.01); *B60C 2019/004* (2013.01)

(58) Field of Classification Search
CPC combination set(s) only.
See application file for complete search history.

(56) References Cited

U.S. PATENT DOCUMENTS

| | | |
|---|---|---|
| 4,031,508 A | 6/1977 | Omori |
| 5,798,696 A | 8/1998 | Wong |
| 8,212,690 B1* | 7/2012 | Partin .................... G08G 1/042 340/561 |
| 2003/0201044 A1* | 10/2003 | Schick .................... B60C 11/24 152/152.1 |

(Continued)

FOREIGN PATENT DOCUMENTS

| | | |
|---|---|---|
| CN | 205970656 U | 2/2017 |
| CN | 106864181 A * | 6/2017 |

(Continued)

OTHER PUBLICATIONS

Dombrowski et al., "Measurement of Needle Puncture Resistance Using an Electronic Puncture Detection System," Proceedings of SAMPE 2012, May 21-24, 2012, 13 pages.
Slime, "Flat Tire Repair Kit—Digital," Slime Products, 2019, 7 pages, retrieved from https://shop.slime.com/collections/flat-tire-repair-kits/products/flat-tire-repair-kit-digital?variant=46927196936.

(Continued)

*Primary Examiner* — Andrew W Bee
(74) *Attorney, Agent, or Firm* — Zilka-Kotab, P.C.

(57) ABSTRACT

An apparatus includes a grid circuit having dimensions corresponding to an inner surface of a tire, a computational device coupled to the grid circuit, and a wireless communications device coupled to the computational device. The wireless communications device is configured to transmit detection of damage to the grid circuit. A computer-implemented method includes monitoring a grid circuit positioned in a tire to detect damage to conductors of the grid circuit, detecting damage to at least one of the conductors of the grid circuit, and transmitting information about the damage to a computer of a vehicle. A computer-implemented method includes receiving, from a computational device coupled to a grid circuit in a tire, information about damage to the grid circuit and outputting an indication that the tire is damaged.

18 Claims, 3 Drawing Sheets

(56) References Cited

U.S. PATENT DOCUMENTS

| | | | |
|---|---|---|---|
| 2007/0255475 A1* | 11/2007 | Dagh | B60T 8/00 |
| | | | 701/71 |
| 2012/0029759 A1* | 2/2012 | Suh | G07C 5/006 |
| | | | 701/29.4 |
| 2013/0319085 A1 | 12/2013 | Schwab et al. | |
| 2014/0261944 A1* | 9/2014 | Papakonstantopoulos | ................. |
| | | | B60C 5/14 |
| | | | 152/510 |
| 2018/0170127 A1* | 6/2018 | DeBates | B60C 23/0433 |
| 2019/0266465 A1* | 8/2019 | Uijlenbroek | G06K 19/025 |

FOREIGN PATENT DOCUMENTS

| | | |
|---|---|---|
| WO | 2018054584 A2 | 3/2018 |
| WO | 2018057511 A1 | 3/2018 |

OTHER PUBLICATIONS

Bryant, J., "Know How Notes—Emergency Tire Plug Repair," National Automotive Parts Association, Jun. 10, 2015, pp. 1-8, retrieved from http://knowhow.napaonline.com/know-how-notes-emergency-tire-plug-repair/.

Matsuzaki et al., "Review: Wireless Monitoring of Automobile Tires for Intelligent Tires," Sensors, vol. 8, Dec. 9, 2008, pp. 8123-8138.

Jensen, S., "Smarter Tire Technologies: Integration of sensors into tracks and tires is helping to monitor and improve their performance," OEM Off-Highway, Feb. 5, 2019, pp. 1-9, retrieved from https://www.oemoffhighway.com/electronics/sensors/article/21043545/smarter-tire-technologies.

Newell et al., "Integrity Sensing with Smart Polymers and Rubber Components on Vehicles (i.e. Tires, Hoses, Seals)," SAE International, 2013 World Congress & Exhibition, Apr. 8, 2013, 6 pages.

* cited by examiner

TIRE PUNCTURE DETECTION AND ALERT

BACKGROUND

The present invention relates to detecting a puncture in a tire, and more specifically, this invention relates to detecting and locating a puncture in a tire and alerting a user to the specific location of the puncture.

Foreign objects may become embedded in a tire and cause damage to the tire and/or to other components of the vehicle. Drivers may not be immediately aware of a puncture in a tire due to sealants in the tire which prevent drastic changes in tire pressure, distractions on the road, the speed of travel, etc. Operating a vehicle with a tire puncture increases the likelihood of a blowout of the tire, resulting in a dangerous situation and/or a relatively more expensive repair.

SUMMARY

An apparatus, according to one embodiment, includes a grid circuit having dimensions corresponding to an inner surface of a tire, a computational device coupled to the grid circuit, and a wireless communications device coupled to the computational device. The wireless communications device is configured to transmit detection of damage to the grid circuit.

A computer-implemented method, according to one embodiment, includes monitoring a grid circuit positioned in a tire to detect damage to conductors of the grid circuit, detecting damage to at least one of the conductors of the grid circuit, and transmitting information about the damage to a computer of a vehicle.

A computer-implemented method, according to one embodiment, includes receiving, from a computational device coupled to a grid circuit in a tire, information about damage to the grid circuit and outputting an indication that the tire is damaged.

Other aspects and embodiments of the present invention will become apparent from the following detailed description, which, when taken in conjunction with the drawings, illustrate by way of example the principles of the invention.

DETAILED DESCRIPTION

Figure 1:
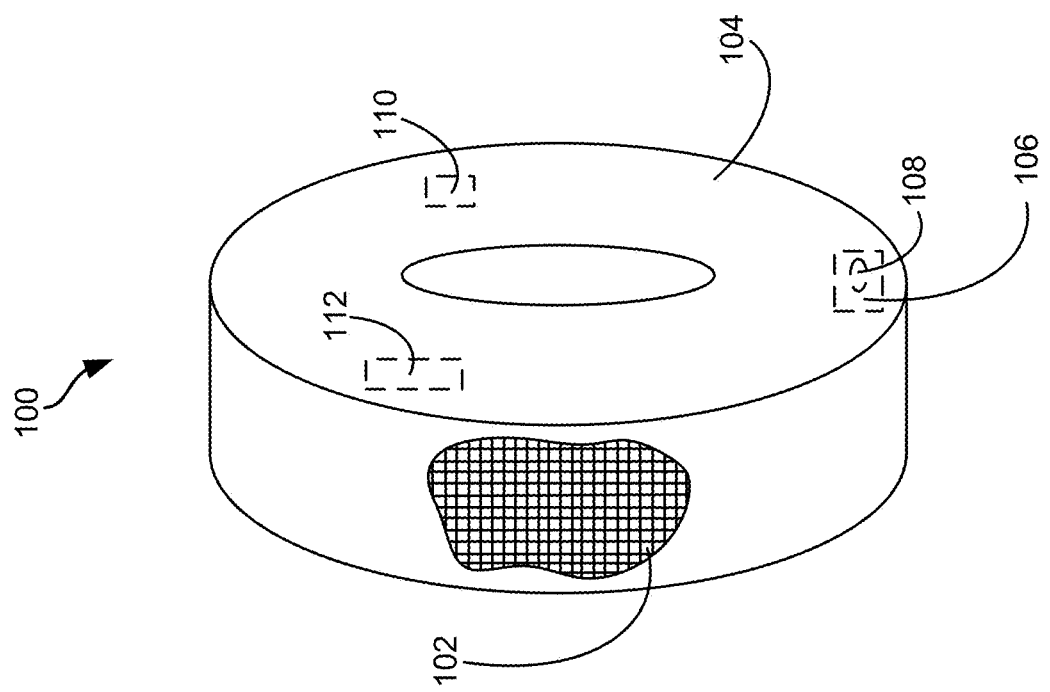
FIG. 1 is a cutaway view of an exemplary apparatus, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for detecting tire punctures.

In one general embodiment, an apparatus includes a grid circuit having dimensions corresponding to an inner surface of a tire, a computational device coupled to the grid circuit, and a wireless communications device coupled to the computational device. The wireless communications device is configured to transmit detection of damage to the grid circuit.

In another general embodiment, a computer-implemented method includes monitoring a grid circuit positioned in a tire to detect damage to conductors of the grid circuit, detecting damage to at least one of the conductors of the grid circuit, and transmitting information about the damage to a computer of a vehicle.

In yet another general embodiment, a computer-implemented method includes receiving, from a computational device coupled to a grid circuit in a tire, information about damage to the grid circuit and outputting an indication that the tire is damaged.

Foreign objects may become embedded in a tire and cause damage to the tire and/or to other components of the vehicle. Drivers may not be immediately aware of a puncture in a tire due to distractions on the road, sealants in the tire which prevent drastic changes in tire pressure, the speed of travel, etc. Operating a vehicle with a tire puncture increases the likelihood of a blowout of the tire, resulting in a dangerous situation and/or a relatively more expensive repair.

Conventional methods of detecting and repairing tire punctures require dismounting the entire wheel from the vehicle and placing the wheel in a tank of water. Escaping air from the tire puncture causes bubbles to form around the damaged area and confirm the location of the puncture. Removing the entire wheel from the vehicle is often time consuming and/or unavailable; especially when the tire puncture occurs on the side of the road. A tub of water or equivalent mechanism is not always accessible on the road. Conventional methods of detecting and repairing tire punctures leave few options other than limping the vehicle to the nearest tire repair facility (while risking further damage to the vehicle) and/or requesting road side assistance services which may be expensive and/or inaccessible.

In many cases, non-sidewall punctures may be easily repaired on the road using conventional tire repair kits. The difficulty of locating the tire puncture deters many users from attempting repairs on the road.

In many situations, the driver is not immediately aware of the tire puncture. Many drivers rely on the Tire Pressure Monitoring System (TPMS) to detect a change in tire pressure below a hardcoded threshold. The TPMS does not provide puncture warnings to the drivers. The hardcoded threshold may be too high for a driver to be immediately aware of a tire puncture. Relying on the TPMS may result in significant tire damage from unknowingly driving with a tire puncture until the tire pressure is low enough to cause a TPMS notification. Low pressure in the tire will eventually destroy the inner liner and/or the reinforcing cords of the tire. The tire may blow out and cause a dangerous event on the road.

Various embodiments of the present invention detect a tire puncture, alert a user to the tire puncture immediately, and provide the user with the radial location of the puncture without having to uninstall the tire. Early detection of tire puncture may reduce the risk that the tire is damaged beyond repair and may improve the efficacy of tire repair performed on the side of the road.

FIG. 1 depicts a cutaway view of an apparatus 100, in accordance with one embodiment. As an option, the present apparatus 100 may be implemented in conjunction with features from any other embodiment listed herein, such as those described with reference to the other FIGS. Of course, however, such apparatus 100 and others presented herein may be used in various applications and/or in permutations which may or may not be specifically described in the illustrative embodiments listed herein. Further, the apparatus 100 presented herein may be used in any desired environment.

The apparatus 100 includes a grid circuit 102 having dimensions corresponding to an inner surface of a tire 104. In a preferred approach, the grid circuit 102 has a circumference about equal to the inner surface circumference of the tire 104 and a width about equal to the inner surface width of the tire 104. The tire 104 may be of a vehicle, trailer, motor vehicle, aircraft, etc.

In one embodiment, the apparatus 100 comprises an adhesive layer coupled to the grid circuit 102. The adhesive layer may be configured to adhere the grid circuit 102 to the inner surface of the tire 104. The grid circuit 102 may be coupled to an inner surface of a tire 104 using any adhesive element known in the art.

In another embodiment, the grid circuit 102 may be integrated into the tire. For example, the grid circuit 102 may be integrated into the tire 104 as part of the injection molding process of the tire. The grid circuit 102 may be embedded into the tire 104 in any manner known in the art.

The grid circuit 102 may include circuitry of uniquely identifiable, electrically conductive "breakable" wires along the x-axis and y-axis of the grid circuit 102 where the dimensions of the squares of the grid are at least 1 mm×1 mm. In a preferred embodiment, the dimensions of the squares of the grid are no greater than 1 mm×1 mm such that a puncture by an item comprising a relatively small circumference (e.g., for example, a nail) disrupts at least one wire in the grid circuit 102. The wires may be insulated so as not to contact other wires within the grid circuit 102. Relatively small amounts of current may be applied to each wire within the grid circuit 102 in order for a computational device 106 (to be discussed in further detail below) to substantially constantly monitor resistance readings. In one configuration, each conductor line (e.g., wire) represents a coordinate point in the x-axis and the y-axis. The associations between the conductors and the coordinates may be stored in the computational device 106. The associations may be stored in any manner known in the art. In a preferred approach, the associations are stored in a table.

In a preferred embodiment, the grid circuit 102 is an installable layer of circuitry outlined in a relatively high resolution grid configuration for detecting tire punctures which penetrate the grid configuration. In a preferred embodiment, the resolution of the grid is high enough such that a puncture substantially anywhere in the grid circuit may contact at least one wire in the grid circuit.

The apparatus 100 includes a computational device 106 coupled to the grid circuit 102. The computational device 106 may be any computational device known in the art. The computational device 106 may perform at least some of the operations disclosed in method 200 and/or method 300. In a preferred embodiment, the computational device 106 includes storage for information associated with the grid circuit 102. The computational device 106 may measure and/or store resistances across each conductor within the grid circuit 102. The computational device 106 may measure and/or store resistances substantially constantly, periodically, at a time interval set by the user, the manufacturer, the default settings, etc.

The apparatus 100 includes a wireless communication device 108 coupled to the computational device 106. The wireless communication device 108 is configured to transmit detection of grid circuit 102 damage. The wireless communication device 108 may be a Bluetooth device, a radio frequency identification tag (RFID) tag, or any wireless communication device known in the art.

The apparatus 100 includes a gyroscope 110. The gyroscope 110 may be used to detect roll, pitch, yaw, etc. movements. The gyroscope 110 may be any rotational gyroscope, vibrational gyroscope, optical gyroscope, etc. In a preferred embodiment, the gyroscope 110 is configured to provide information about at least an orientation of the tire. Information about at least an orientation of the tire may be used to indicate where a tire puncture occurs according to various embodiments of method 200 and/or method 300.

The apparatus 100 includes a power source 112. The power source 112 may be a battery, a thermoelectric generator, or any power source known in the art. In a preferred embodiment, the power source 112 is a low current power source which is independent of any power source of a vehicle associated with the tire 104.

In various approaches, the locations of the computational device 106, the wireless communication device 108, and the power source 112 are balanced (e.g., substantially evenly spaced) along the inner surface of the tire 104. In a preferred configuration, the computational device 106, the wireless communication device 108, and the power source 112 are at triangular opposing locations on the inner surface of the tire 104 to minimize balance disturbance imposed on the wheel.

In various approaches, the apparatus 100 may include a vehicle associated with the tire having a computer configured to output an indication that the grid circuit 102 has been damaged. The computer may be any computer known in the art. In various approaches, the computer may output audio, visual, audiovisual alerts and/or information about the damage. In a preferred approach, the computer is configured to output a three-dimensional (3D) visual indication of the radial degree location of the tire puncture through the grid circuit 102. The 3D visual indication may be updated in real time to reflect the orientation of the tire and the tire puncture as the vehicle continues to move. The updating of orientation may be based on the gyroscope 110 readings and/or information derived from the computational device 106.

In some approaches, the apparatus 100 and/or at least some of the components of the apparatus 100 (e.g., for example, the grid circuit 102) are one-time-use products to be replaced after a tire puncture. In other approaches, the apparatus 100 and/or at least some of the components of the apparatus 100 (e.g., for example, the grid circuit 102) may be rebuilt and/or reused.

Figure 2:
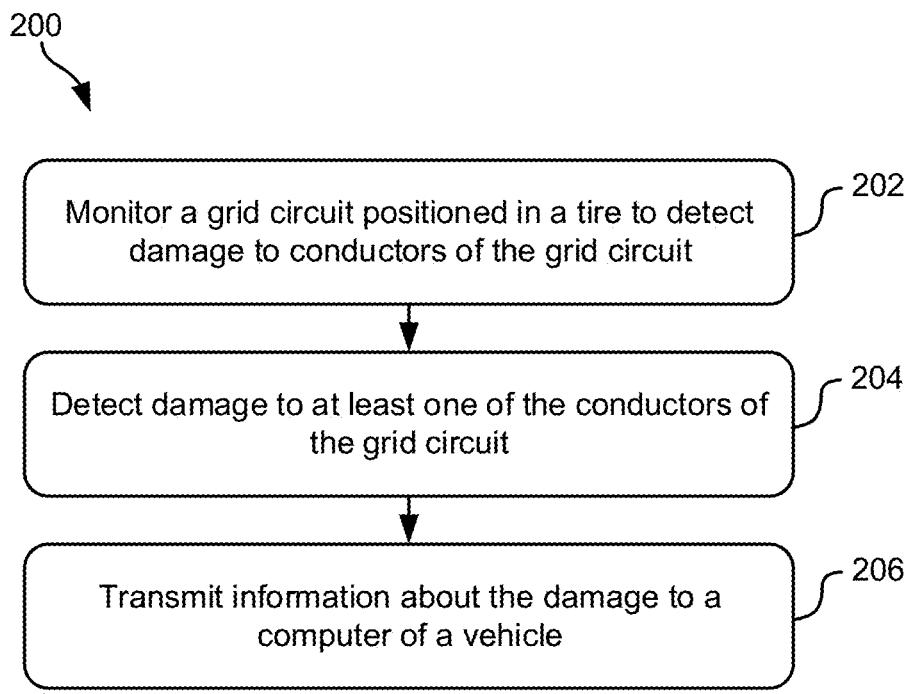
FIG. 2 is a flowchart of a method, in accordance with one embodiment of the present invention.

Now referring to FIG. 2, a flowchart of a method 200 is shown according to one embodiment. The method 200 may be performed in accordance with the present invention in any of the environments depicted in FIGS. 1 and 3-4, among others, in various embodiments. Of course, more or less operations than those specifically described in FIG. 2 may be included in method 200, as would be understood by one having ordinary skill in the art upon reading the present descriptions.

Each of the steps of the method 200 may be performed by any suitable component of the operating environment. For example, in various embodiments, the method 200 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 2, method 200 includes operation 202. Operation 202 includes monitoring a grid circuit positioned in a tire to detect damage to conductors of the grid circuit. The tire may be on the vehicle in various approaches although it should be understood by one having ordinary skill in the art that the tire does not have to be on the vehicle to perform at least some of the operations of the present method. In other approaches, the tire may be on a towable vehicle being towed by the vehicle. For example, the tire may be on a towable trailer, another vehicle being towed by the vehicle, etc.

Various operations of method 200 may be performed by a computational device (e.g., see FIG. 1) coupled to the grid circuit positioned in the tire. In one approach, the grid circuit may be adhered to and/or integrated into an inner surface of the tire as discussed above in reference to FIG. 1.

Monitoring a grid circuit positioned in a tire includes measuring resistances across conductors of the grid circuit in order to detect changes in resistance. At least one of the conductors of the grid circuit may be disturbed and/or broken as a result of a tire puncture through the grid circuit. Damage to at least one of the conductors may disrupt the flow of current through the grid circuit.

Operation 204 includes detecting damage to at least one of the conductors of the grid circuit. In response to a puncture of a foreign object into the tire, one or more of the conductors in the grid circuit may be disturbed and/or broken. In various approaches, a computational device integrated with the grid circuit detects a change in resistance across the conductors. In a preferred approach, each conductor is uniquely identifiable by location in the x-axis and the y-axis of the grid circuit. A gyroscope sensor integrated with the grid circuit may provide the roll, pitch, and/or yaw measurements and/or data derived from the foregoing measurements including at least an orientation of the tire. In a preferred approach, the radial degree location of the tire puncture is based on the location of the damaged conductors and information derived from the gyroscope sensor readings.

Operation 206 includes transmitting information about the damage to a computer of a vehicle. Information about the damage may include the time of the puncture, the location of the vehicle when the puncture occurred, the size of the puncture, etc. In one embodiment, the information includes a location corresponding to a location of the damage to the conductors of the grid circuit. The location of the damage may be in terms of the x-axis and y-axis of the grid circuit, a corresponding location on the tire, a location in relation to parts of the tire, etc. In a preferred embodiment, the location is derived in part from the gyroscope information. In another preferred embodiment, the information about the damage includes the radial degree location of the tire puncture based on the location of the damaged conductors and information derived from the gyroscope sensor readings.

In one embodiment, the information may be transmitted by a wireless communications device (e.g., see FIG. 1). The information may be transmitted via an audio alert, a visual alert, a textual alert, or any combination of the foregoing alerts. In a preferred configuration, the radial degree location of the tire puncture may be a three-dimensional (3D) visual representation of the tire and the tire puncture presented to the user via the computer of the vehicle. The 3D representation of the radial degree location of the tire puncture may be used to quickly find and repair the tire puncture without removing the entire wheel from the vehicle. In one embodiment, the information transmitted about the damage may include instructing the user of the vehicle to move the vehicle slightly forward and/or backward in order to easily access the tire puncture (e.g., rotate the tire puncture from directly under the vehicle to a forward-facing or backward-facing position which is substantially perpendicular to the ground).

In another approach, the information about the damage includes a substantially immediate (e.g., within one revolution of the tire) alert to the driver that the tire is punctured. In a preferred approach, a substantially immediate alert may be sent to the driver within 30 seconds of the puncture. In other approaches, the alert may be periodically sent to the driver based on a predefined time period, constantly set to the driver based on a predefined time period, etc., until the driver pulls the vehicle over and the tire ceases to rotate. The alert may include a recommendation that the driver pull the car over to safety, a recommendation to repair the tire, instructions on how to repair the tire, etc. In one approach, the alert may indicate that the puncture is not suitable for repair (e.g., based on the size and/or location of the tire puncture) and include information regarding the nearest tire repair facility, available roadside assistance services, etc. For example, a large tire puncture may not be repairable with conventional tire repairs kits, sidewall punctures may not be repairable due to safety concerns, etc.

In another approach, operation 206 may include transmitting information about the damage to any remote device. For example, information about the damage may be transmitted to a remote cellular device of a user associated with the vehicle.

In one embodiment, a power source (e.g., for the grid circuit, the computational device, and/or the wireless communication device, etc.), the computational device, and the wireless communications device are located in the tire at triangular opposing locations. In another embodiment, the power source, the computational device, and the wireless communications device are balanced (e.g., substantially evenly spaced) along the grid circuit and the inner surface of the tire.

Figure 3:
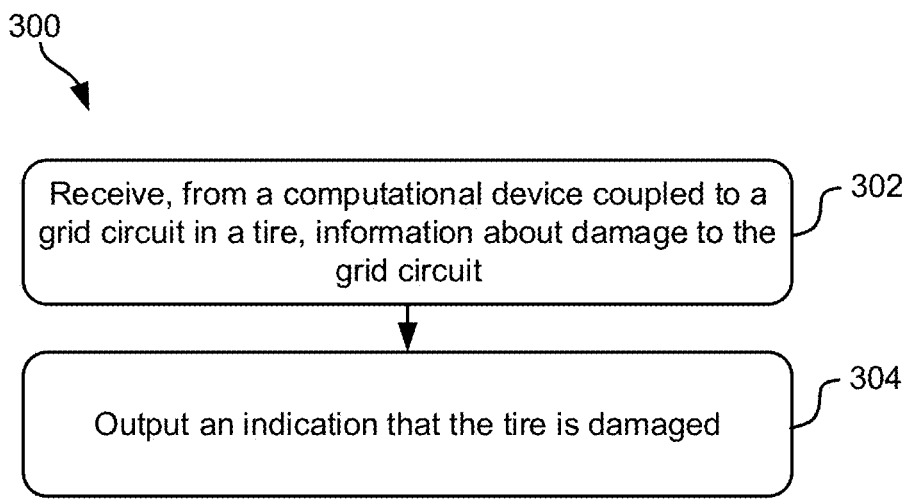
FIG. 3 is a flowchart of a method, in accordance with one embodiment of the present invention.

Now referring to FIG. 3, a flowchart of a method 300 is shown according to one embodiment. The method 300 may be performed in accordance with the present invention in any of the environments depicted in FIGS. 1-2 and 4, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 includes operation 302. Operation 302 includes receiving, from a computational device coupled to a grid circuit in a tire, information about damage to the grid circuit. The information about damage to the grid circuit may be received by the computer of a vehicle. The computational device may be of the type discussed in reference to FIGS. 1 and 2. The information about the damage to the grid circuit may be any information as described above in operation 206.

Operation 304 includes outputting an indication that the tire is damaged. In a preferred embodiment, operation 304 is performed by the computer of the vehicle. The indication that the tire is damaged may include a visual indication of a location on the tire corresponding to the damage to the grid circuit. In other approaches, the indication may include an audio alert, a visual alert, a textual alert, or any combination of the foregoing alerts. In a preferred configuration, the indication may include the radial degree location of the tire puncture represented as a three-dimensional (3D) visual indication of the tire and the tire puncture. The 3D indication may include a representation of the radial degree location of the tire puncture which may be used to quickly find and repair the tire puncture without removing the entire wheel from the vehicle.

In one embodiment, the indication may include instructing the user of the vehicle to move the vehicle slightly forward and/or backward in order to easily access the tire puncture (e.g., rotate the tire puncture from directly under the vehicle to a forward-facing or backward-facing position which is substantially perpendicular to the ground).

In another approach, the information about the damage includes a substantially immediate alert to the driver that the tire is punctured. The indication may include a recommendation that the driver pull the car over to safety, a recommendation to repair the tire, instructions on how to repair the tire, etc. In one approach, the indication may indicate that the puncture is not suitable for repair and include information regarding the nearest tire repair facility, available roadside assistance services, etc.

In another approach, the indication may be output to any remote device. For example, information about the damage to the tire may be transmitted to a remote cellular device of a user associated with the tire.

Figure 4:
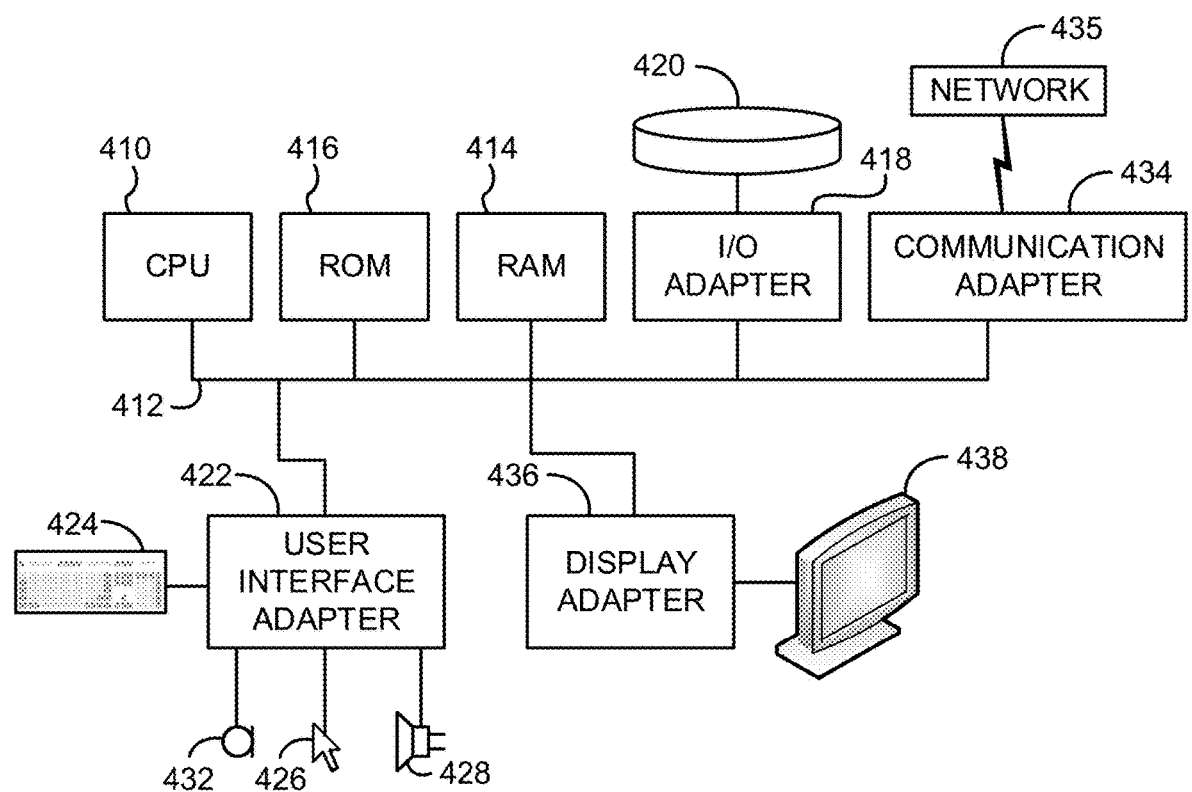
FIG. 4 shows a representative hardware environment that may be associated with various servers and/or clients in accordance with one embodiment of the present invention.

FIG. 4 shows a representative hardware environment associated with a user device and/or server, in accordance with one embodiment. Such figure illustrates a typical hardware configuration of a workstation having a central processing unit 410, such as a microprocessor, and a number of other units interconnected via a system bus 412.

The workstation shown in FIG. 4 includes a Random Access Memory (RAM) 414, Read Only Memory (ROM) 416, an input/output (I/O) adapter 418 for connecting peripheral devices such as disk storage units 420 to the bus 412, a user interface adapter 422 for connecting a keyboard 424, a mouse 426, a speaker 428, a microphone 432, and/or other user interface devices such as a touch screen and a digital camera (not shown) to the bus 412, communication adapter 434 for connecting the workstation to a communication network 435 (e.g., a data processing network) and a display adapter 436 for connecting the bus 412 to a display device 438.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
    a grid circuit having dimensions corresponding to an inner surface of a tire;
    a computational device coupled to the grid circuit;
    a gyroscope configured to provide gyroscope information; and
    a wireless communications device coupled to the computational device, the wireless communications device being configured to transmit detection of damage to the grid circuit to a computer of a vehicle, wherein the wireless communications device is configured to transmit information about the damage to the computer of the vehicle, wherein the information includes a location corresponding to the location of the damage, wherein the location is derived in part from the gyroscope information.

2. The apparatus of claim 1, comprising an adhesive layer coupled to the grid circuit, the adhesive layer being configured to adhere to the inner surface of the tire.

3. The apparatus of claim 1, wherein the gyroscope is configured to provide information about at least an orientation of the tire.

4. The apparatus of claim 1, comprising the tire.

5. The apparatus of claim 4, wherein the grid circuit is adhered to the inner surface of the tire.

6. The apparatus of claim 4, wherein the grid circuit is integrated into the tire.

7. The apparatus of claim 4, comprising a power source, wherein the power source, computational device, and wireless communications device are located in the tire at triangular opposing locations.

8. The apparatus of claim 1, wherein the computer is configured to output an indication that the grid circuit has been damaged.

9. The apparatus of claim 1, wherein the computer is configured to output a visual indication of a location on the tire corresponding to the damage to the grid circuit.

10. The apparatus of claim 1, wherein the computer is configured to output instructions to a user of the vehicle to move the vehicle for accessing the damage, wherein the tire is on the vehicle.

11. The apparatus of claim 10, wherein the computer is configured to output recommendations for repair of the damage to the user of the vehicle, wherein the recommendations are derived at least in part on the location of the damage.

12. A computer-implemented method, comprising:
monitoring a grid circuit positioned in a tire to detect damage to conductors of the grid circuit;
detecting damage to at least one of the conductors of the grid circuit; and
transmitting information about the damage to a computer of a vehicle, wherein the information includes a location corresponding to the location of the damage to the conductors of the grid circuit, wherein the location is derived in part from gyroscope information.

13. The computer-implemented method of claim 12, wherein the tire is on the vehicle.

14. The computer-implemented method of claim 12, wherein the tire is on a towable vehicle being towed by the vehicle.

15. The computer-implemented method of claim 12, wherein the grid circuit is adhered to an inner surface of the tire.

16. The computer-implemented method of claim 12, wherein the grid circuit is integrated in the tire.

17. The computer-implemented method of claim 12, wherein the monitoring is performed by a computational device coupled to the grid circuit, wherein the information is transmitted by a wireless communications device coupled to the computational device, wherein a power source, the computational device, and the wireless communications device are located in the tire at triangular opposing locations.

18. A computer-implemented method, comprising:
receiving, from a computational device coupled to a grid circuit in a tire, information about damage to the grid circuit;
outputting an indication that the tire is damaged, wherein the indication that the tire is damaged includes a visual indication of a location on the tire corresponding to the damage to the grid circuit; and
outputting instructions to a user of a vehicle to move the vehicle for accessing the damage, wherein the tire is on the vehicle, wherein the visual indication of the location on the tire corresponding to the damage to the grid circuit is updated in real-time in response to moving the vehicle, wherein the visual indication of the location on the tire corresponding to the damage to the grid circuit comprises a 3-dimensional (3D) representation of the tire.

* * * * *